United States Patent [19]

Bardl

[11] Patent Number: 5,940,498
[45] Date of Patent: Aug. 17, 1999

[54] ELECTRONIC VOICE CIRCUIT CONFIGURATION

[75] Inventor: Artur Bardl, München, Germany

[73] Assignee: Siemens Aktiengesellschaft, Munich, Germany

[21] Appl. No.: 08/876,742

[22] Filed: Jun. 16, 1997

[30] Foreign Application Priority Data

Jun. 14, 1996 [DE] Germany .............................. 196 23 827

[51] Int. Cl.⁶ ..................................................... H04H 1/00
[52] U.S. Cl. ........................... 379/387; 379/389; 379/390; 379/391; 379/394; 379/395; 379/399; 379/402; 379/413
[58] Field of Search ..................................... 379/387, 389, 379/390, 391, 394, 395, 399, 402, 413

[56] References Cited

U.S. PATENT DOCUMENTS

| 4,723,278 | 2/1988 | Nishio et al. ............................ 379/394 |
| 4,916,735 | 4/1990 | Iida et al. ................................. 379/413 |
| 5,032,819 | 7/1991 | Sakuragi et al. ..................... 340/310 A |
| 5,323,461 | 6/1994 | Rosenbaum et al. ................... 379/399 |

FOREIGN PATENT DOCUMENTS

| 0600175A1 | 6/1994 | European Pat. Off. ....... H04M 19/00 |
| 3806346A1 | 9/1988 | Germany ........................ G06G 7/186 |
| 267861A1 | 5/1989 | Germany ....................... H04M 19/00 |
| 3613913C2 | 10/1994 | Germany ....................... H04M 19/00 |

*Primary Examiner*—N. Le
*Assistant Examiner*—S. Hsieh
*Attorney, Agent, or Firm*—Herbert L. Lerner; Laurence A. Greenberg

[57] ABSTRACT

An electronic voice circuit configuration can be connected through a first and a second line terminal to a telephone line. The electronic voice circuit configuration has a calling part, a transmitting device, a receiver device, a symmetrical modulator circuit with voltage stabilization, a symmetrical equipment impedance device with a device for symmetry control and direct-current limiting, and a symmetrical control device.

15 Claims, 3 Drawing Sheets

ELECTRONIC VOICE CIRCUIT CONFIGURATION

BACKGROUND OF THE INVENTION

FIELD OF THE INVENTION

The invention relates to an electronic voice circuit configuration which can be connected through a first and a second line terminal to a telephone line and which has a calling part, a transmitting device, a receiver device, an equipment impedance device and a control device.

The coupling of telephone accessories, which operate at higher and higher frequencies, to the analog line interface increases the risk of wanted/interference radiation being coupled into audio amplification paths and leads to interference with operation. Demodulation products caused in that way can no longer be kept away from the baseband of the analog transmission channel.

For complexity and cost reasons, all known electronic voice circuits are asymmetric with respect to the reference ground which is defined between floating potentials of a,b wires themselves. In general, the reference ground potential, to which all coupled inputs are short-circuited, is always very close to the negative line wire. The desired operating resistance of the equipment, across which the operating voltage is dropped, is located towards the positive line wire. Interference that is coupled-in is short-circuited to the reference ground of the voltage supply. That results in an interference loop, which makes itself evident as a hum voltage in the line network.

That asymmetry increases the difficulties of structural layout to avoid interference coupling. If transformers are used, such as those which are utilized in classic analog switching technology, those problems are very largely overcome since the supply and receiver ground potential is always at half the supply voltage, and a new, independent ground reference can be selected through a magnetic coupling to the secondary of the transformer circuit. That procedure is uneconomical for terminal equipment for telephones, for cost reasons.

SUMMARY OF THE INVENTION

It is accordingly an object of the invention to provide an electronic voice circuit configuration, which overcomes the hereinafore-mentioned disadvantages of the heretofore-known devices of this general type and which makes it possible, in given boundary conditions with DC coupling, to balance a reference ground potential in such a way that it is at half a supply voltage between a,b connecting terminals.

With the foregoing and other objects in view there is provided, in accordance with the invention, an electronic voice circuit configuration, comprising first and second line terminals to be connected to a telephone line; a calling part connected to the line terminals; a modulator circuit having an input side connected to the line terminals and having an output side; first, second and third nodes connected to the output side of the modulator circuit; a transmitting device connected to the modular circuit for transmitting signals; a receiving device connected to the modulator circuit for receiving signals; an equipment impedance device having an input side coupled through the first, second and third nodes to the modulator circuit and having an output side; fourth, fifth and sixth nodes connected to the output side of the equipment impedance device; and a control device connected through the fourth, fifth and sixth nodes to the output side of the equipment impedance device; the first and fourth nodes and the first line terminal carrying potentials forming a positive line section, and the second and fifth nodes and the second line terminal carrying potentials forming a negative line section; the third node carrying a first mid-potential and the sixth node carrying a second mid-potential; and the potentials at the first and second nodes disposed symmetrically around the first mid-potential, and the potentials at the fourth and fifth nodes disposed symmetrically around the second mid-potential.

In accordance with another feature of the invention, the second mid-potential is a reference ground potential.

In accordance with a further feature of the invention, the symmetrical modulator circuit includes a device for voltage stabilization, modulator devices each disposed in a respective one of the positive and negative line sections for voltage stabilization, and a switching apparatus interconnecting the modulator devices, the switching apparatus having an output connected to the third node for carrying the first mid-potential.

In accordance with an added feature of the invention, the equipment impedance device has an equipment resistance split half on the positive line section and half on the negative line section.

In accordance with an additional feature of the invention, the symmetrical equipment impedance device includes a symmetrical voltage divider disposed between the fourth and fifth nodes with a base point connected to the sixth node.

In accordance with yet another feature of the invention, the equipment impedance device includes a control amplifier device compensating for tolerances between the first and second mid-voltages, the potential of the fourth node in each case matching the potential of the fifth node.

In accordance with yet a further feature of the invention, the symmetrical equipment impedance device includes flow-control devices each disposed in a respective one of the positive and negative line sections for direct-current limiting.

In accordance with yet an added feature of the invention, each of the flow-control devices includes first and second current mirrors having an input and an output and mutually reversed transformation ratios, each of the flow-control devices includes a flow-control transistor having a base terminal and having a collector current driving the input of the first current mirror, and the output of the second current mirror driving the base terminal of the flow-control transistor.

In accordance with yet an additional feature of the invention, the equipment impedance device includes at least one of a voltage limiting device, a device for short-circuiting AC signals, a device for protection against high frequencies, and a voltage stabilization device for the control device.

In accordance with again another feature of the invention, there is provided a configuration having a hybrid function and separating the received signal from the transmitted signal for feeding to the receiving device.

In accordance with a concomitant feature of the invention, the calling part has a device for call identification and call disconnection, a DC/DC converter for impedance transformation and an apparatus for calling voltage rectification, and the calling part provides control signals for call identification and call disconnection, as well as a first control potential and a second control potential matched to a symmetry of the modulator circuit, of the equipment impedance device and of the control device.

Other features which are considered as characteristic for the invention are set forth in the appended claims.

Although the invention is illustrated and described herein as embodied in an electronic voice circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
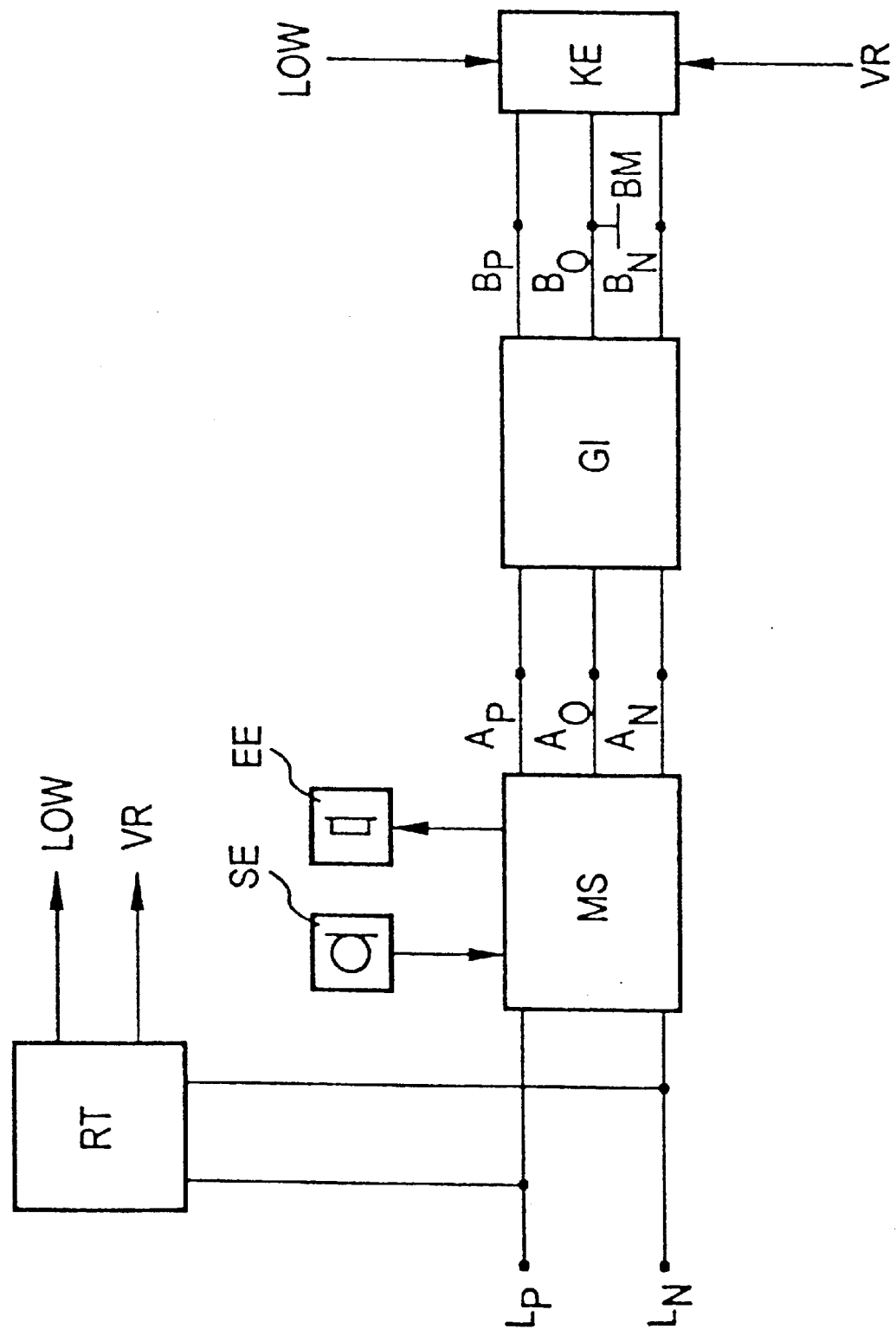
FIG. 1 is a block diagram of a symmetrical electronic voice circuit according to the invention.

Referring now to the figures of the drawings in detail and first, particularly, to FIG. 1 thereof, there is seen a block diagram of a symmetrical electronic voice circuit according to the invention. In this case, nodes or first and second line terminals $L_P$ and $L_N$ form analog line interfaces between the electronic voice circuit and an operator network, for example a telephone network. Indices P and N respectively represent positive and negative line sections or line paths of the electronic voice circuit. Signals are received and transmitted bidirectionally through the nodes $L_P$ and $L_N$. When the electronic voice circuit is coupled to the public telephone network and is not in use, the nodes $L_P$ and $L_N$ are normally at potentials of 60 V and 0 V, respectively. In the following text, inputs and outputs of the elements of the electronic voice circuit have been defined for a receive mode. In a transmit mode, the inputs and outputs are correspondingly interchanged. The nodes $L_P$ and $L_N$ are connected on the input side to a modulator circuit MS. The modulator circuit is connected on the output side through first, second and third nodes $A_P$, $A_N$ and $A_O$ to an equipment impedance device GI. In addition, the modulator circuit is connected to a receiver device EE for receiving signals, and to a transmitting device SE for transmitting signals. The potentials of the nodes $A_P$ and $A_N$ are symmetrical with respect to the potential at the node $A_O$. The equipment impedance device GI is connected on the output side through fourth, fifth and sixth nodes $B_P$, $B_N$ and $B_O$ to a control device KE. The potentials at the nodes $B_P$ and $B_N$ are symmetrical with respect to a reference ground potential BM at the node $B_O$.

The nodes $L_P$ and $L_N$ are, in addition, also connected to a calling part RT, which contains apparatuses for call identification and call disconnection. Control potentials LOW and VR for driving the control device are provided by the calling part.

Figure 2:
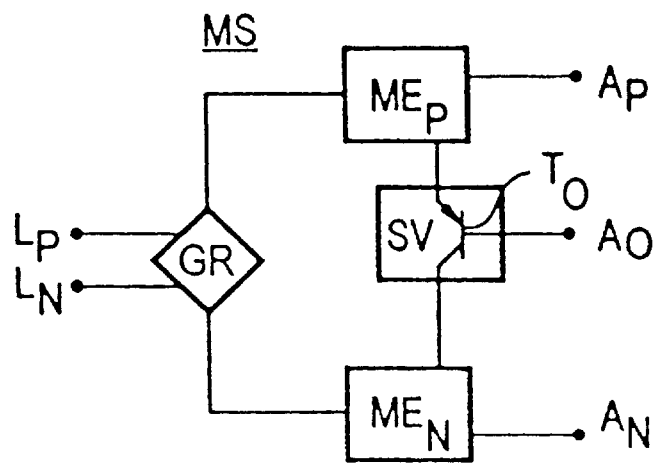
FIG. 2 is a schematic and block diagram of a voltage stabilization circuit with a modulator for a voice circuit according to the invention.

FIG. 2 shows a block diagram of a voltage stabilization circuit with a modulator. Signals are coupled through the nodes $L_P$ and $L_N$ to the electronic voice circuit, and are supplied to a rectification circuit GR. Signals are supplied from an output of the rectifier circuit to modulator devices $ME_P$, $ME_N$. First outputs of the respective modulator devices $ME_P$ and $ME_N$ are connected to the respective nodes $A_P$ and $A_N$. A switching apparatus SV connects respective second outputs of the modulator devices to one another. The switching apparatus may, for example, be a switching transistor $T_O$ having an emitter-collector path that connects the respective second outputs of the modulator devices to one another. A base of the switching transistor is connected to the node $A_O$. In addition, the switching apparatus provides further equipment functions such as switchhook, hands-free dialing, hold function and number switch. In the steady state, the control paths of the modulator devices are stabilized in such a way that the potentials at the nodes $A_P$ and $A_N$ are symmetrical with respect to the potential at the node $A_O$.

The modulator devices contain apparatuses for opening and closing a loop current. MOS transistors or bipolar transistors are generally used as loop current closing devices. When either MOS transistors or bipolar transistors are used, complementary types must be used which have very different characteristics, because of the different physical semiconductor conduction properties. Symmetry requires that the drain-source voltage drops through the devices for closing the loop current have a magnitude which is as equal as possible. This makes it necessary for voltage stabilization to be provided for the loop current closing devices in the positive and the negative line section.

Figure 2A:
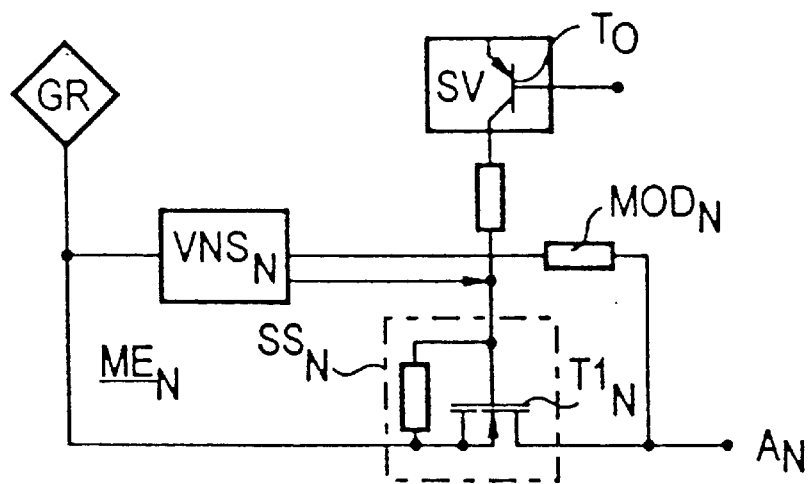
FIG. 2a is a schematic and block diagram showing an implementation of a modulator for a negative line section for a voice circuit according to the invention.

FIG. 2a shows a block diagram for one implementation of voltage stabilization for the modulator device $ME_N$. The modulator device $ME_N$ essentially includes a loop current closing device $SS_N$, a comparator and tracking stage $VNS_N$ and a modulator voltage divider $MOD_N$ having a hybrid function. In the present example, the loop current closing device essentially includes a normally-off n-channel MOS transistor $T1_N$ and a resistor connected in parallel with a gate-source junction of the transistor. A voltage drop across the transistor controls the transistor into conduction and switches on the voltage stabilization stage of the modulator device. A drain-source junction of the MOS transistor connects the node $A_N$ to the rectifier circuit. A gate of the MOS transistor is driven by a collector current of the switching transistor $T_O$. The comparator and tracking stage $VNS_N$ is connected in series with the modulator voltage divider $MOD_N$, in parallel with the drain-source junction of the MOS transistor. The modulator voltage divider forms an operating resistance of the comparator and tracking stage. The output of the second input of the comparator and tracking stage is connected to the gate connection of the MOS transistor of the loop current closing device.

The comparator and tracking stage $VNS_N$ essentially includes a current mirror and operating resistors which are connected upstream of emitter inputs of the current mirror. A basic DC current, which is input from the transmitting device SE, is used in the comparator and tracking stage to compare the voltage drop across the two operating resistances with one another. If the voltage drops across the two operating resistances are equal, then a DC operating point has been produced. The constant voltages at the two MOS transistors in the loop current closing device are equal. If the constant voltages of the MOS transistors differ, then the voltage drops across the operating resistors of the current mirrors likewise differ. Depending on whether the DC operating point has been exceeded or undershot, a current is added to the collector current of the transistor $T_O$ in the negative line section, or a current is taken from the emitter current of the transistor $T_O$ in the positive line section. The drain-source voltages of the MOS transistors can thus be modulated through the comparator and tracking stage. The constant voltage across the MOS transistors is reproduced in this way. A mid-potential with respect to the potentials at the nodes $A_P$ and $A_N$ is obtained at the node $A_O$ by the voltage regulation and the symmetrical layout of the modulator circuit.

Figure 2B:
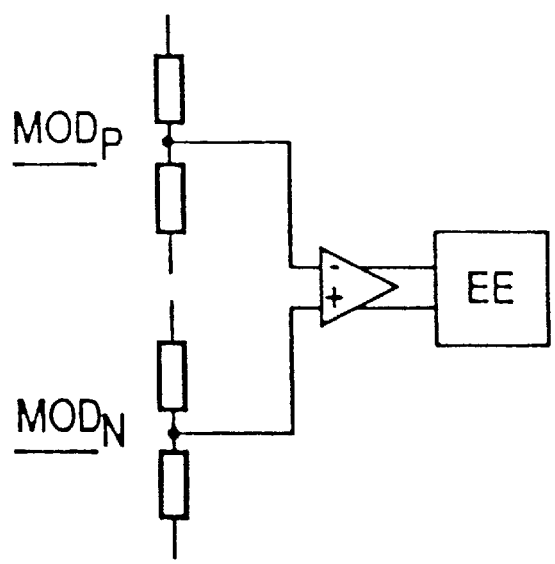
FIG. 2b is a simplified schematic and block circuit diagram for outputting a received signal from a symmetrical modulator circuit for a voice circuit according to the invention.

FIG. 2b shows a simplified circuit diagram for outputting a received signal from the symmetrical modulator circuit. Two resistors in modulator voltage dividers $MOD_P$ and $MOD_N$ have the same resistance and in each case a signal is output between them and is supplied to the receiver device EE. In addition to the received signal element, the output signals also contain a transmitted signal element, which is not desired in the receiver device. The output signals are supplied to the two mutually inverse inputs of an operational amplifier. As a result of a voltage divider ratio of 1:1 and the fact that $MOD_P$ and $MOD_N$ have the same total resistances, the transmitted signal, which is superimposed on the received signal, is phase-shifted through 180°. The transmitted signal is canceled out by the positive and negative input of the operational amplifier, while the receiver signal is amplified by a factor of 2. In engineering, such a circuit is often also called a hybrid or echo-canceler. In the receiver device, the received signal is further amplified and emitted to the converter, in a known manner. In the transmitting device, the transmitted signals are correspondingly amplified and are supplied to a voltage-current converter. Two alternating currents, which can also have direct currents superimposed on them, are supplied with opposite polarity but in-phase to the modulator circuit.

Figure 3:
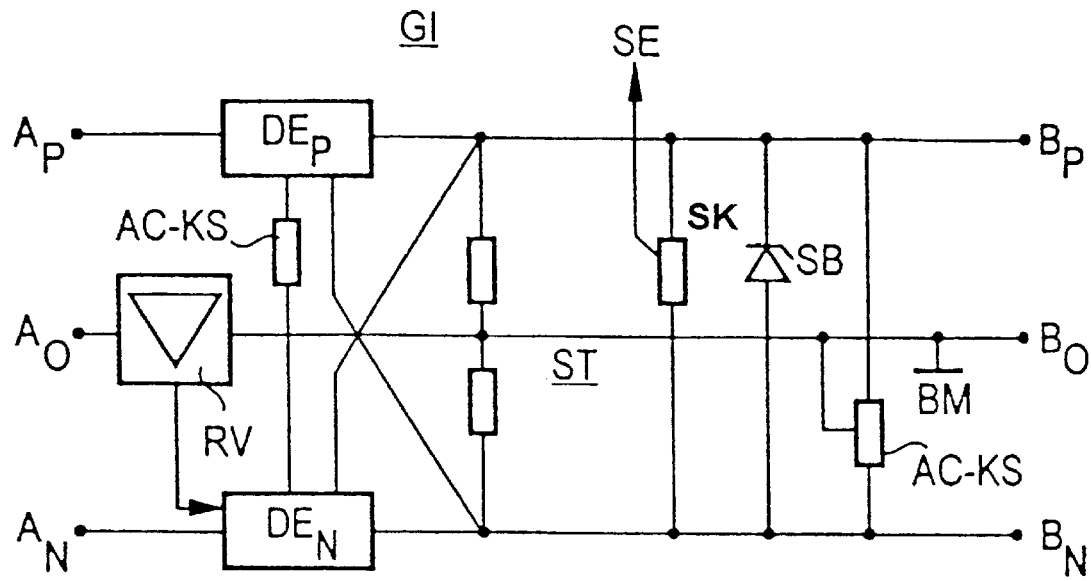
FIG. 3 is a schematic and block diagram showing an implementation of a symmetric equipment impedance in a voice circuit according to the invention.

FIG. 3 shows a block diagram for the implementation of an equipment impedance device GI with symmetry regulation. The symmetry in this case relates to an equipment resistance across which the operating voltage is dropped. The equipment impedance device essentially contains one flow-control device $DE_P$, $DE_N$ in each of a positive and a negative line section, a symmetrical voltage divider ST and a control amplifier device RV. The flow-control devices $DE_P$, $DE_N$ are connected on the input sides to the respective nodes $A_P$ and $A_N$. The flow-control devices $DE_P$, $DE_N$ are respectively connected at a first output to the respective nodes $B_P$ and $B_N$. Respective second outputs of the flow-control devices $DE_P$ and $DE_N$ are connected, crossed over, to the respective nodes $B_N$ and $B_P$. The symmetrical voltage divider device ST is connected between the nodes $B_N$ and $B_P$ and a base point thereof is connected to the node $B_O$. In addition, the control amplifier device RV is provided with a first input which is connected to the node $B_O$ and a second input which is connected to the node $A_O$. The control amplifier device RV drives the flow-control device $DE_N$ on the output side.

The control amplifier device essentially includes an amplifier, for example an operational amplifier, having inverting inputs which are connected to the nodes $A_O$ and $B_O$. An output side of the control amplifier drives the flow-control device. The mid-voltage of the equipment impedance device is obtained through the voltage divider ST. Due to the tolerances of the transistors in the flow-control devices, this mid-voltage is not at the same voltage level as the mid-voltage of the modulator circuit. The amplifier in the control amplifier device compensates for this difference by tracking. In this case, by adding or subtracting a current from the control amplifier device to or from the flow-control device $DE_N$, the difference potential in the negative line section between the nodes $A_N$ and $B_N$ is drawn to the level of the positive line section. A ground point is thus produced between resistors in the voltage divider ST, which is a symmetrical ground point to which all interference can be short-circuited. The potentials at the nodes $B_P$ and $B_N$ are thus symmetrical with respect to the reference ground potential at the node $B_O$.

In addition, a voltage limiting device SB, for example a Zener diode, is provided between the nodes $B_P$ and $B_N$ for carrying out voltage limiting for the entire circuit. A voltage limit of 5 V or 6.5 V is normally chosen in this case. In addition, AC short-circuiting devices AC-KS, for example capacitors, are provided between each of the nodes $B_P$, $B_N$ and $B_O$, as well as between the flow-control devices. Furthermore, a voltage stabilization apparatus SK is also provided for the control device, between the nodes $B_P$ and $B_N$. This apparatus measures the current consumed by the control device. If the control device is consuming too much or too little current, the basic DC current in the modulator device is tracked by a signal to the transmitting device. This avoids the control device crashing during operation.

Figure 3A:
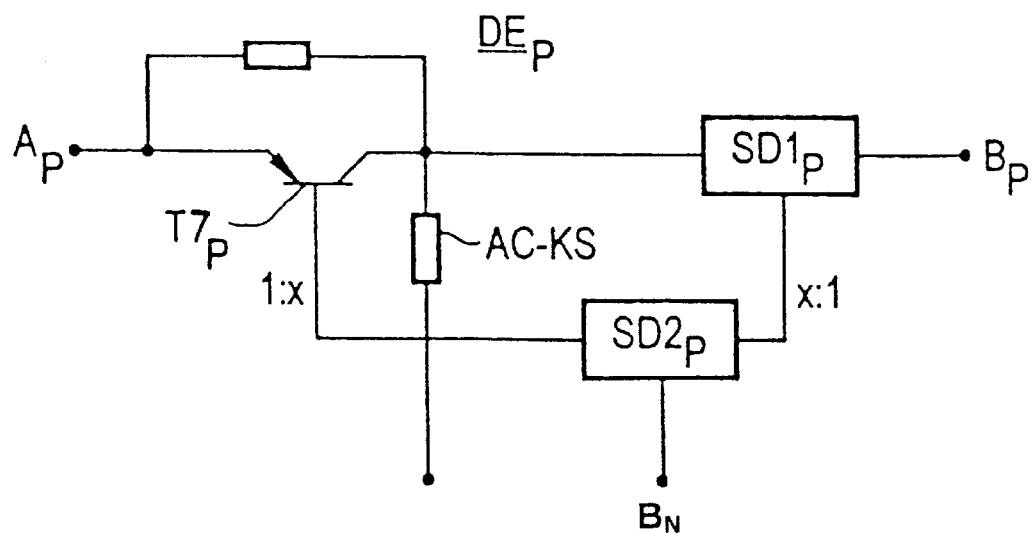
FIG. 3a is a schematic and block diagram showing an implementation of a direct-current flow-control device for the positive line section for a voice circuit according to the invention.

FIG. 3a shows one implementation of the flow-control device $DE_P$. The flow-control device $DE_P$ essentially includes a transistor $T7_P$, a resistor connected in parallel with an emitter-collector path of the transistor, as well as two current mirrors $SD1_P$ and $SD2_P$ with a diode function. The emitter-collector path of the transistor $T7_P$ connects the node $A_P$ to an input of the current mirror $SD1_P$. The current is mirrored with a transformation ratio of x:1 through a first output of the current mirror $SD1_P$ onto the current mirror $SD2_P$, and with a transformation ratio of 1:x from a first output of the current mirror $SD2_P$ onto a base terminal of the transistor $T7_P$. The transistor $T7_P$ thus operates as a direct-current flow-control device and therefore forms a current sink or direct-current limiting device. The resistor which is connected in parallel with the emitter-collector path of the transistor $T7_P$ corresponds to half the equipment resistance. The equipment resistance is normally standardized at 600 Ω. The equipment resistance can also be omitted and carried out by active impedance adjustment. Second outputs of the current mirrors $SD1_P$ and $SD2_P$ are connected to the respective nodes $B_P$ and $B_N$. On the collector side, the positive line section of the flow-control device $DE_P$ is connected through an AC short-circuiting device AC-KS to the collector side of the negative line section of the flow-control device $DE_N$.

As mentioned above, in addition the electronic voice circuit contains the calling part RT. The calling part contains a rectifier as well as apparatuses for call identification, call disconnection and DC/DC converters for impedance transformation. On the output side, the digital control potential LOW is supplied from the calling part for driving the control device KE. The control device KE is thus supplied when calling is taking place. In addition, the further potential VR, which is provided from the DC/DC converter, is supplied to the control devices. As a result of the symmetrical layout of the electronic voice circuit, all of the potentials in the calling part are likewise matched to the symmetrical circuit.

The symmetrical electronic voice circuit according to the invention is constructed in such a way that it can be implemented by an integrated circuit just as effectively as by using discrete components, or a mixture of both.

I claim:

1. An electronic voice circuit configuration, comprising:

first and second line terminals to be connected to a telephone line;

a calling part connected to said line terminals;

a modulator circuit having an input side connected to said line terminals and having an output side;

first, second and third nodes connected to said output side of said modulator circuit;

a transmitting device connected to said modulator circuit for transmitting signals;

a receiving device connected to said modulator circuit for receiving signals;

an equipment impedance device having an input side coupled through said first, second and third nodes to said modulator circuit and having an output side;

fourth, fifth and sixth nodes connected to said output side of said equipment impedance device; and a control device connected through said fourth, fifth and sixth nodes to said output side of said equipment impedance device;

said first and fourth nodes and said first line terminal carrying potentials forming a positive line path, and said second and fifth nodes and said second line terminal carrying potentials forming a negative line path;

said third node carrying a first mid-potential and said sixth node carrying a second mid-potential; and the potentials at said first and second nodes being symmetrical with respect to the first mid-potential, and the potentials at said fourth and fifth nodes being symmetrical with respect to the second mid-potential.

2. The electronic voice circuit according to claim 1, wherein the second mid-potential is a reference ground potential.

3. The electronic voice circuit according to claim 1, wherein said symmetrical modulator circuit includes a device for voltage stabilization, modulator devices each disposed in a respective one of said positive and negative line paths for voltage stabilization, and a switching apparatus interconnecting said modulator devices, said switching apparatus having an output connected to said third node for carrying the first mid-potential.

4. The electronic voice circuit according to claim 1, wherein said equipment impedance device has an equipment resistance split half on said positive line path and half on said negative line path.

5. The electronic voice circuit according to claim 4, wherein said symmetrical equipment impedance device includes a symmetrical voltage divider disposed between said fourth and fifth nodes with a base point connected to said sixth node.

6. The electronic voice circuit according to claim 4, wherein said equipment impedance device includes a control amplifier device compensating for tolerances between the first and second mid-voltages, the potential of said fourth node in each case matching the potential of said fifth node.

7. The electronic voice circuit according to claim 4, wherein said symmetrical equipment impedance device includes flow-control devices each disposed in a respective one of said positive and negative line paths for direct-current limiting.

8. The electronic voice circuit according to claim 7, wherein each of said flow-control devices includes first and second current mirrors having an input and an output and mutually reversed transformation ratios, each of said flow-control devices includes a flow-control transistor having a base terminal and having a collector current driving the input of said first current mirror, and the output of said second current mirror driving the base terminal of said flow-control transistor.

9. The electronic voice circuit according to claim 4, wherein said equipment impedance device includes a voltage limiting device, a device for short-circuiting AC signals, a device for protection against high frequencies, and a voltage stabilization device for said control device.

10. The electronic voice circuit according to claim 4, wherein said equipment impedance device includes a voltage limiting device.

11. The electronic voice circuit according to claim 4, wherein said equipment impedance device includes a device for short-circuiting AC signals.

12. The electronic voice circuit according to claim 4, wherein said equipment impedance device includes a device for protection against high frequencies.

13. The electronic voice circuit according to claim 4, wherein said equipment impedance device includes a voltage stabilization device for said control device.

14. The electronic voice circuit according to claim 1, including a configuration having a hybrid function and separating the received signal from the transmitted signal for feeding to said receiving device.

15. The electronic voice circuit according to claim 1, wherein said calling part has a device for call identification and call disconnection, a DC/DC converter for impedance transformation and an apparatus for calling voltage rectification, and said calling part provides control signals for call identification and call disconnection, as well as a first control potential and a second control potential matched to a symmetry of said modulator circuit, of said equipment impedance device and of said control device.

* * * * *